(12) United States Patent
Quinn et al.

(10) Patent No.: US 8,317,172 B2
(45) Date of Patent: Nov. 27, 2012

(54) MULTISTAGE JOUNCE BUMPER

(75) Inventors: Shawn G. Quinn, Grand Blanc, MI (US); Gregory J. Fadler, Commerce Township, MI (US); William C. Gregory, Milford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1059 days.

(21) Appl. No.: 11/626,876

(22) Filed: Jan. 25, 2007

(65) Prior Publication Data

US 2008/0179148 A1 Jul. 31, 2008

(51) Int. Cl.
*F16F 9/00* (2006.01)

(52) U.S. Cl. .............. 267/220; 267/35; 267/64; 267/15; 267/219; 267/256

(58) Field of Classification Search .................... 267/35, 267/64, 15, 219, 220, 256
See application file for complete search history.

(56) References Cited

U.S. PATENT DOCUMENTS

| | | | |
|---|---|---|---|
| 2,701,714 A | 2/1955 | Harwood, Jr. | |
| 2,737,301 A | 3/1956 | Thornhill | |
| 2,856,035 A | 10/1958 | Rohacs | |
| 2,861,795 A | 11/1958 | Blake | |
| 3,115,349 A | 12/1963 | Lerg | |
| 3,164,381 A | 1/1965 | Tuczek | |
| 3,647,239 A * | 3/1972 | Katsumori | 280/124.154 |
| 3,656,633 A * | 4/1972 | Ostwald | 213/43 |
| 3,658,314 A * | 4/1972 | Luzsicza | 267/121 |
| 3,773,147 A | 11/1973 | Wiebe | |
| 4,185,719 A | 1/1980 | Faris et al. | |
| 4,234,172 A * | 11/1980 | Takahashi | 267/220 |
| 4,416,445 A * | 11/1983 | Coad | 267/35 |
| 4,747,587 A * | 5/1988 | Ferrel | 267/220 |
| 4,871,150 A * | 10/1989 | Salver et al. | 267/140.13 |
| 5,467,971 A | 11/1995 | Hurtubise et al. | |
| 5,678,808 A * | 10/1997 | Claude et al. | 267/64.15 |
| 6,257,605 B1 * | 7/2001 | Zernickel et al. | 280/124.147 |
| 6,415,895 B2 | 7/2002 | Marking et al. | |
| 6,427,814 B1 * | 8/2002 | Miyamoto | 188/321.11 |
| 6,655,669 B1 * | 12/2003 | Jung | 267/220 |
| 6,776,402 B2 * | 8/2004 | Miyamoto et al. | 267/220 |
| 2006/0027954 A1 | 2/2006 | Nesbitt et al. | |

FOREIGN PATENT DOCUMENTS

DE 102004019991 A1 11/2005

OTHER PUBLICATIONS

German Office Action dated Aug. 2, 2010 for German application 10 2008 005 512.3-21, corresponding to U.S. Appl. No. 11/626,876.

* cited by examiner

*Primary Examiner* — Bradley King
*Assistant Examiner* — Mahbubur Rashid

(57) ABSTRACT

A multistage jounce bumper, including a jounce bumper cushion integrated with a hydraulic jounce bumper, wherein provided are the damping characteristic of the hydraulic jounce bumper and the damping/spring characteristics of a jounce bumper cushion. The hydraulic jounce bumper hydraulic response is tunable via adjustment of hydraulic flow with respect to a communicating hydraulic fluid reservoir. When maximum jounce is approached, jounce force and energy are exchanged, at a first stage, with the jounce bumper cushion, then at a predetermined compression, jounce force and energy are exchanged, at a second stage, with the hydraulic jounce bumper. Thereafter, a mechanical abutment is provided as a third stage of jounce management.

15 Claims, 5 Drawing Sheets

MULTISTAGE JOUNCE BUMPER

TECHNICAL FIELD

The present invention relates to automotive suspension systems, particularly the bumper mount, the jounce bumper, and conventional dampers. More particularly, the present invention relates to a multistage jounce bumper which is a synthesis of a jounce bumper cushion and a hydraulic jounce bumper, the combination providing enhanced suspension system energy absorption and improved ride characteristics.

BACKGROUND OF THE INVENTION

Motor vehicle suspension systems are configured so that the wheels are able to follow elevational changes in the road surface as the vehicle travels therealong. When a rise in the road surface is encountered, the suspension responds in "jounce" in which the wheel is able to move upwardly relative to the frame of the vehicle. On the other hand, when a dip in the road surface is encountered, the suspension responds in "rebound" in which the wheel is able to move downwardly relative to the frame of the vehicle. In either jounce or rebound, a spring (i.e., hydraulic fluid, leaf, torsion, etc.) is incorporated at the wheel in order to provide a resilient response to the respective vertical movements with regard to the vehicle frame. However, in order to prevent wheel bouncing and excessive vehicle body motion, a shock absorber is placed at the wheel to dampen wheel bounce. Additionally, when the limit of jounce is encountered, it is customary to provide a maximum jounce impact absorber in the form of a bumper cushion.

Referring now to FIGS. 1 through 1B, components of a conventional suspension system 10 are depicted which allow for jounce and rebound at a wheel of the subject motor vehicle 12.

Firstly with regard to FIG. 1, a control arm 14 is pivotally mounted with respect to the frame 16, wherein, in the depicted example, a torsion spring 18 is utilized to provide resilient response for the jounce and rebound of the control arm relative to the frame. To provide control over the rate of jounce and rebound, a damper in the form of a shock absorber 20 is connected pivotally at one end to the frame 16 and connected pivotally at the other end to the control arm 14. Alternatively, a damper in the form of a strut may be used in the suspension system, as for example disclosed in U.S. Pat. No. 5,467,971. To provide cushioning in the event a maximum jounce occurs, a jounce bumper cushion 22 is mounted to the frame 16 which is resiliently compressed by movement of the control arm as jounce approaches its maximum.

Referring next to FIG. 1A, the internal components and operational aspects of a conventional shock absorber 20' (a remote reservoir high pressure gas type shock absorber being shown merely by way of example) can be understood. A valved piston 30 is reciprocably movable within a shock cylinder 32. A shock rod 34 is attached to the valved piston 30 and is guided by a shock rod guide 36 at one end of the shock cylinder 32. Below the valved piston 30 and above the shock rod guide 36 is a mutually interacting rebound limiter 38. The instantaneous position of the valved piston 30 within the shock cylinder 32 defines a first interior portion 32F and a second interior portion 32S of the interior of the shock cylinder. In the example depicted at FIG. 1A, the pressurization in the first and second interior portions 32F, 32S is provided by an hydraulic fluid O which is pressurized by pressurized gas, preferably nitrogen, G acting on a divider piston 40 of an hydraulic fluid reservoir cylinder 42, wherein a tube 44, including a base valve 44V, connects the hydraulic fluid between the hydraulic fluid reservoir cylinder and the first interior portion. In operation, as the control arm undergoes jounce, the hydraulic fluid is displaced from the first interior portion into the hydraulic fluid reservoir cylinder, causing the pressure of the nitrogen gas to increase as its volume decreases and thereby causing an increased hydraulic pressure on the valved piston 30 in a direction toward the shock rod guide. Hydraulic fluid is able to directionally meter through valving 46 of the valved piston 30 in a manner which provides damping.

Referring next to FIG. 1B, the internal structure of a conventional jounce bumper cushion 22 can be understood. An optional skin 50 of a compliant material (i.e., having energy absorbing or damping properties) may, or may not, overlay an interior of resilient elastomeric material 52, which may be for example a rubber, rubber-like material, or micro-cellular urethane. In operation as the control arm approaches maximum jounce, the jounce bumper cushion 22 compresses, delivering a reaction force on the control arm which increases with increasing compression so as to minimize the severity of impact of the control arm with respect to the frame at the limit of jounce. Immediately following the jounce, the rebound involves the energy absorbed by the compression of the conventional bumper cushion being delivered resiliently back to the suspension.

In the art of motor vehicle suspension systems, it is known that a conventional jounce bumper cushion and related dampers can show wear. It is also known that when the energy absorbed from a particular bump or dip exceeds the capacity of a conventional jounce bumper cushion, a hard mechanical stop is engaged. This abrupt transfer of jounce force and energy to the frame manifests itself in the passenger compartment as a sharp jolt, which can create load management issues in addition to the discomfort of a rough ride.

What remains needed in the art is a multistage jounce bumper, which can absorb an enhanced level of suspension system jounce force and energy as compared to a conventional jounce bumper cushion, while improving the feel and control of the ride.

SUMMARY OF THE INVENTION

The present invention is a multistage jounce bumper, which absorbs additional jounce force and energy as compared with a conventional jounce bumper cushion of motor vehicles, while improving the feel and control of the ride.

The multistage jounce bumper according to the present invention includes a jounce bumper cushion integrated with a hydraulic jounce bumper. The present invention allows for an enhancement of energy absorption as a vehicle wheel goes into a full jounce position. The present invention provides the damping characteristic of a hydraulic jounce bumper as well as the damping/spring characteristics of a jounce bumper cushion. The hydraulic jounce bumper hydraulic response to a jounce is tunable via adjustment of hydraulic fluid flow with respect to a communicating hydraulic fluid reservoir.

In operation, as maximum jounce is approached, jounce force and energy are exchanged between the knuckle or control arm of the suspension system and the multistage jounce bumper. The jounce bumper cushion provides a first stage of response to the jounce force by providing a resilient reaction force against the jounce force and may absorb jounce energy until it is fully compressed (i.e., saturated). A second stage of response to the jounce force is provided by the hydraulic jounce bumper, which is engaged at a predetermined amount of compression of the jounce bumper cushion (which may be before saturation). Tuning of the initial response of the hydraulic jounce bumper provides a seamless transition of jounce force management to the hydraulic jounce bumper from the jounce bumper cushion. As the hydraulic jounce bumper increases reaction force against the jounce force and absorbs more jounce energy, the feel of the ride stiffens in an increasing manner to minimize the ride disruption and enhancement of load control. Once the hydraulic jounce bumper has absorbed a predetermined maximum amount of jounce energy and/or provides a predetermined maximum reaction force to the jounce force, a third stage of response to the jounce force is provided by a hard stop abutment engagement, either in the form of a mechanical abutment or a hydraulic lock (i.e., force transfer through the incompressible hydraulic fluid) of the hydraulic jounce bumper, whereby the remaining jounce force is transferred directly to the vehicle frame.

Accordingly, it is an object of the present invention to provide a multi-stage jounce bumper, including a j ounce bumper cushion integrated with a hydraulic jounce bumper, which absorbs jounce energy beyond that possible of a conventional jounce bumper cushion alone, while improving the feel and control of the ride.

This and additional objects, features and advantages of the present invention will become clearer from the following specification of a preferred embodiment.

DESCRIPTION OF THE PREFERRED EMBODIMENT

Figure 1:
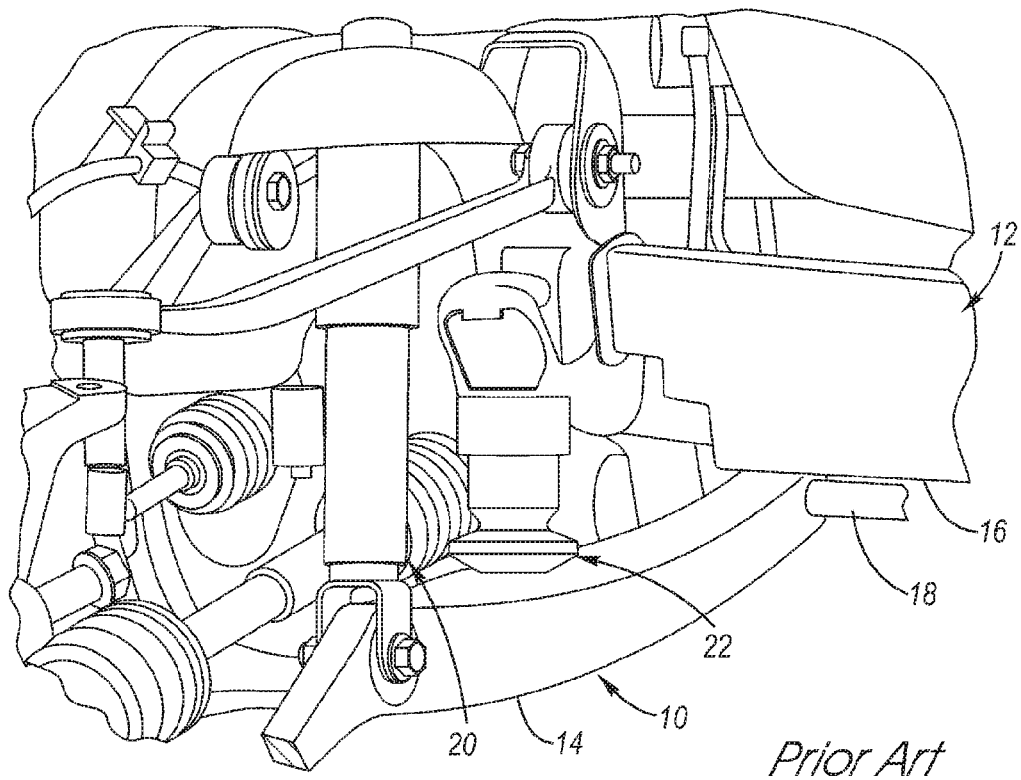
FIG. 1 is a perspective view of a conventional suspension system, including a control arm, a frame, a spring, a conventional shock absorber and a conventional bumper cushion.

Referring now to the Drawing, FIG. 2 through FIG. 6 depict various aspects of structure and function of a multistage jounce bumper according to the present invention. The multistage jounce bumper is a novel synthesis of a jounce bumper cushion, a tunable hydraulic jounce bumper, and related damper components. The resulting expanded jounce management provides improved feel of the ride and enhances the capacity for load control in high-energy, uneven terrain inputs. While any type of damper may be used with the present invention (see discussion of dampers hereinabove), the most preferred form of damper is a strut.

Figure 1A:
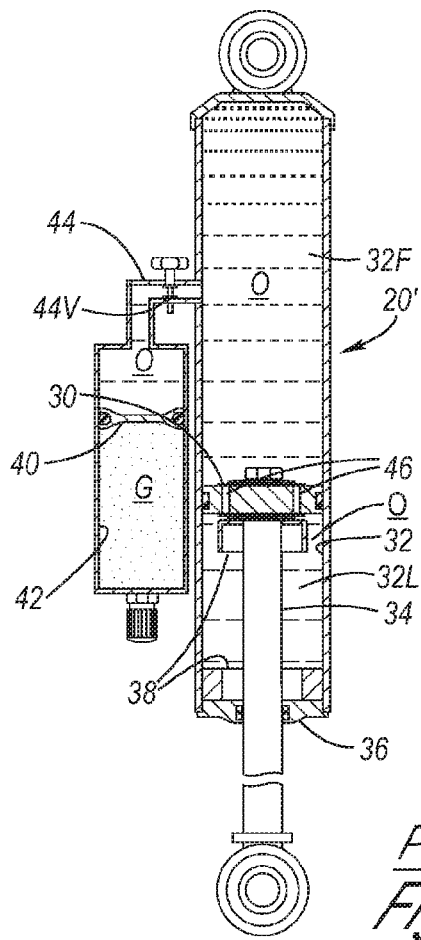
FIG. 1A is a sectional view of a conventional shock absorber.
Figure 2:
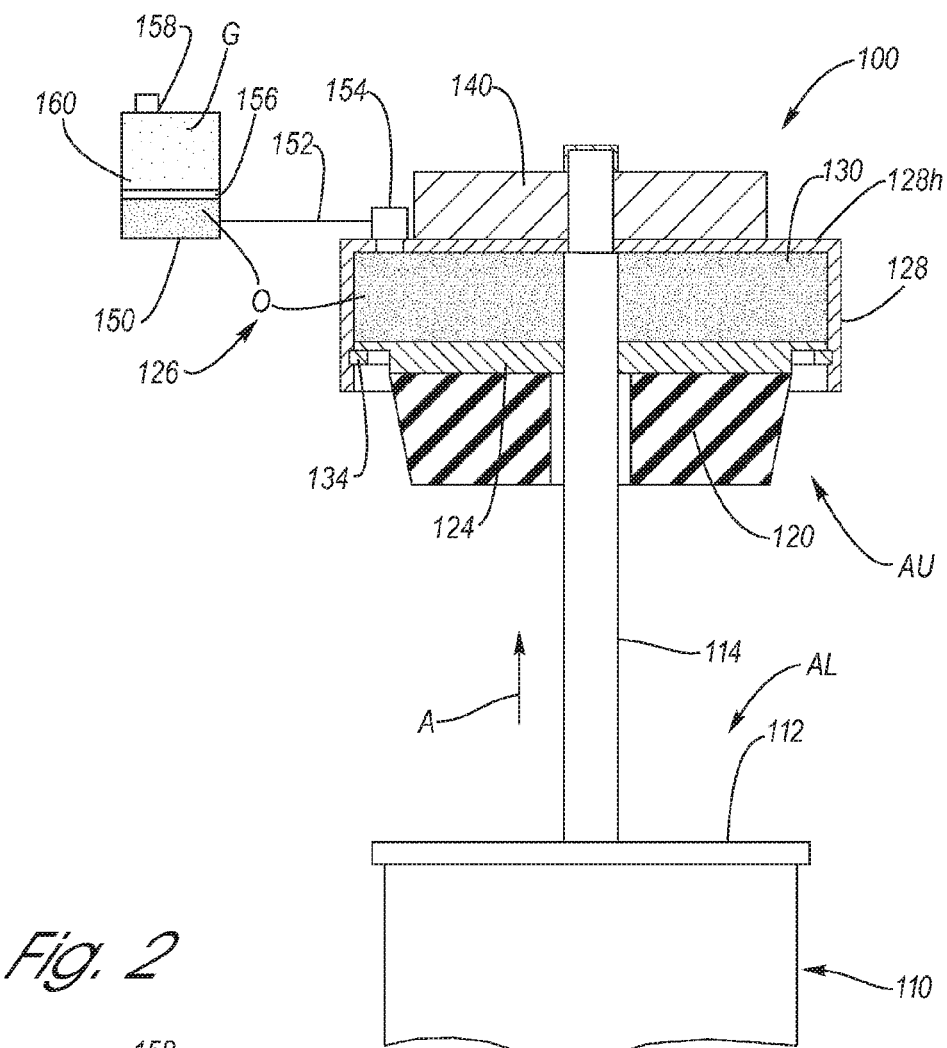
FIG. 2 is a diagrammatic view of a multistage jounce bumper according to the present invention.

Referring firstly to FIG. 2, the multistage jounce bumper 100 according to the present invention is depicted. A lower aspect AL of the multistage jounce bumper 100 consists of a damper 110 (i.e., a strut or shock absorber) which is connected to a knuckle or control arm of the suspension system as generally depicted with respect to the shock absorber 20 of FIG. 1, wherein the damper has connected to an end thereof a damper bump plate 112, and wherein a damper rod 114 passes through the damper bump plate and is internally hydraulically operable in a shock absorber to provide jounce/rebound damping as generally described hereinabove with respect to FIG. 1A or operable in a strut type damper as for example disclosed in U.S. Pat. No. 5,467,971, the disclosure of which is hereby herein incorporated by reference. An upper aspect AU of the multi-stage jounce bumper 100 consists of a jounce bumper cushion 120 connected to a floating puck 124 of a hydraulic jounce bumper 126, wherein the damper rod 114 passes therethrough to a connection at a top mount 140, which is, itself, affixed with respect to the vehicle frame (such as is generally depicted at FIG. 1).

Figure 1B:
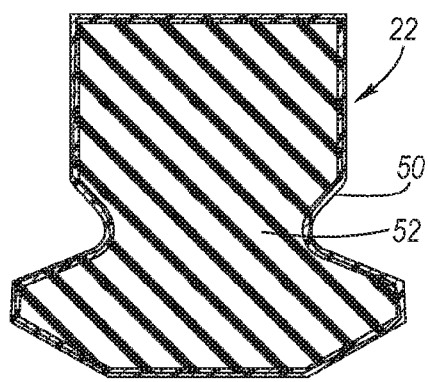
FIG. 1B is a sectional view of a conventional bumper cushion.

The jounce bumper cushion 120, by way of preferred example, is composed of a resilient material, preferably a urethane material, as generally discussed with respect to FIG. 1B. The jounce bumper cushion 120 has a predetermined maximum compression limit (i.e., saturation) when compressed or squeezed between the damper bump plate 112 and the floating puck 124 (see FIG. 2B), the details of which will be discussed further hereinbelow.

The hydraulic jounce bumper 126 consists of a hydraulic cylinder 128 having a cylinder head 128$h$. The floating puck 124 serves as a piston movably mounted with respect to the hydraulic cylinder 128, which in combination with the hydraulic cylinder and the cylinder head, collectively define a hydraulic fluid filled cavity 130, the hydraulic fluid O being preferably oil. A stop ring 134 is attached to the hydraulic cylinder exterior to the hydraulic fluid filled cavity which serves as a travel limiter of the floating puck. The cylinder head 128$h$ is also affixed to the top mount 140.

The response of the hydraulic jounce bumper 126 of the multistage jounce bumper 100 is preferably hydraulically tunable. For example, hydraulic fluid flow may be adjusted through the use of a communicating reservoir 150 via a control valve (which may be in the form of multistage valving) 154 and line 152, whereby the control valve is selectively set so that it meters, in a predetermined manner, hydraulic fluid flow between the hydraulic fluid filled cavity and the communicating reservoir.

At the communicating reservoir 150, a movable piston 156 separates the hydraulic fluid O from a pressurized gas chamber 160. A gas valve 158 is located at the gas chamber 160 which provides for selective connection thereto to a source of pressurized gas G, and may serve as a pressure regulator. The hydraulic jounce bumper 126 may be further tuned by means of adjusting the pressure of the pressurized gas G in the gas chamber 160. The piston 156 prevents the gas G mixing in the hydraulic fluid O and thus compromising the pressure response characteristics of the hydraulic jounce bumper 126.

Figure 2A:
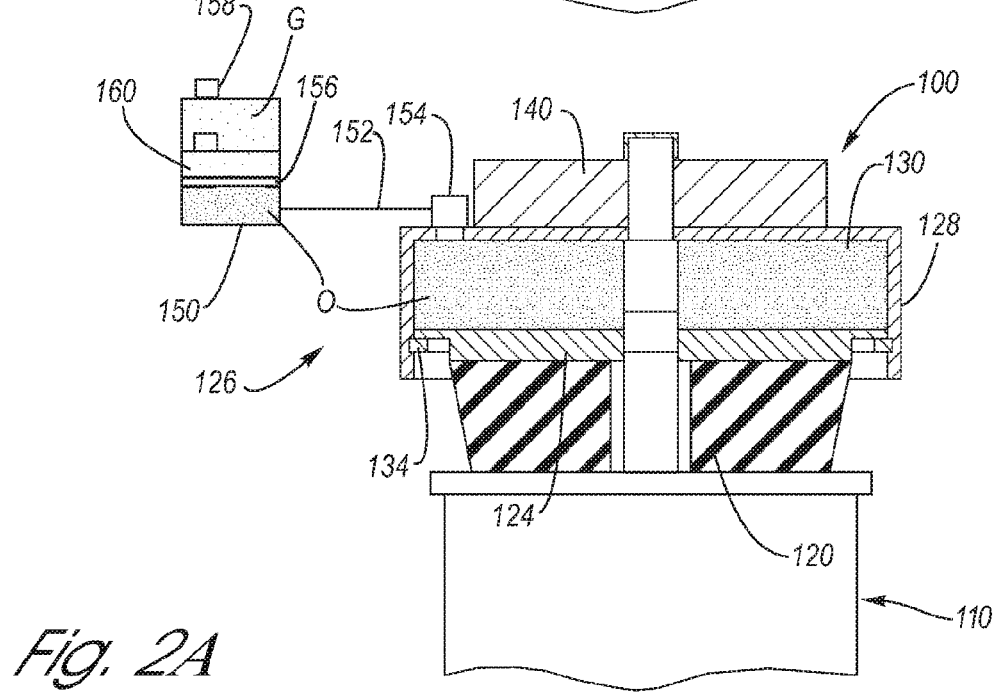
FIGS. 2A through 2C are diagrammatic views of the operation of the present invention, showing progressive stages of energy absorption from a maximum jounce.
Figure 2B:
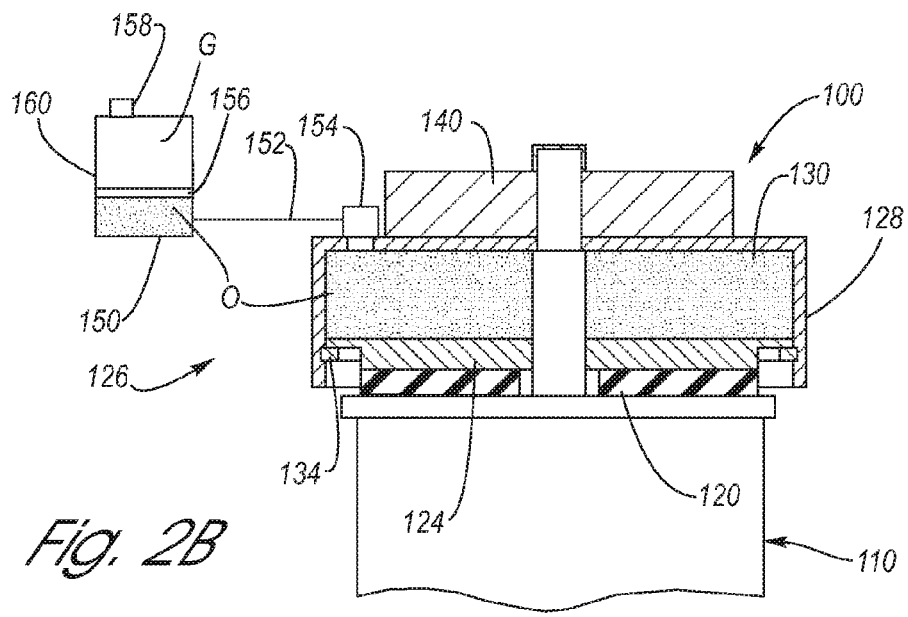
Figure 2C:
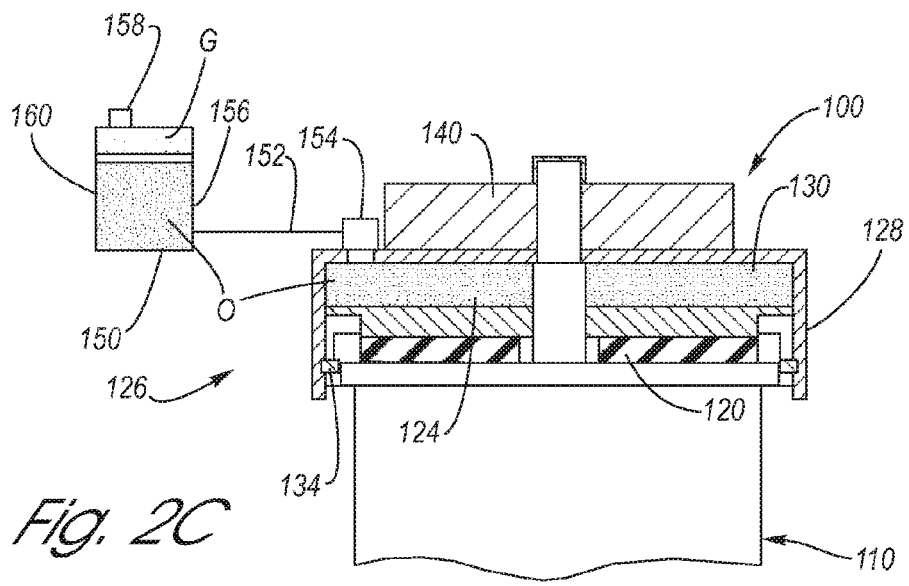

Turning attention now to FIGS. 2A through 2C, operation of the multistage jounce bumper 100 will be detailed.

Referring first to FIG. 2A, as a vehicle wheel approaches maximum jounce, the damper bump plate 112 makes contact with the jounce bumper cushion 120. As the damper 110 moves further toward the top mount 140 (see arrow A in FIG. 2), the jounce bumper cushion 120 is compressed or squeezed between the damper bump plate 112 and the floating puck 124 (which at present remains stationary); whereupon the jounce bumper cushion compresses providing a reaction force to the jounce force and absorption of energy from the jounce motion, which compression constitutes a first stage response of the multistage jounce bumper to the jounce force.

Referring next to FIG. 2B, once a predetermined amount of compression of the jounce bumper cushion 120 has been reached (ie., it is at a predetermined amount of saturation), the floating puck 124 force against the hydraulic fluid O in the hydraulic fluid filled cavity 130 is such that, based upon the hydraulic tuning at the control valve 154, the hydraulic fluid begins a metered flow to the communicating reservoir 150, whereupon the gas G becomes increasingly pressurized. The jounce bumper cushion may continue to compress further, if at the predetermined amount of compression, saturation of the jounce bumper cushion had not yet been reached. This now constitutes a second stage of response by the multistage jounce bumper to the jounce force. The transition between the first and second stages of response to the jounce force is characterized by the floating puck providing a reaction force to the jounce force which is seamlessly continuous with respect to that provided by the jounce bumper cushion at the point of its predetermined amount of compression.

Referring finally to FIG. 2C, the hydraulic fluid O in the hydraulic fluid filled cavity 130 will have absorbed a predetermined maximum of jounce energy, whereat a predetermined minimum volume and/or the hydraulic fluid a predetermined maximum pressure hydraulic fluid is attained. Now a third stage response of the multistage jounce bumper to the jounce force will occur, wherein the remainder of the jounce force and energy will be transferred to the frame of the vehicle through the top mount 140. In one scenario, the control valve 154 closes so as to stop hydraulic fluid flow at a preselected pressure indicative of the minimum volume, whereupon the hydraulic fluid O instantly provides a direct conduit of the jounce force to the top mount as it is incompressibly pressurized. In another scenario, the damper 110 ceases to slide with respect to the damper rod by 114, for example by being mutually abuttingly interconnected, whereupon the jounce force is transferred from the damper rod to the top mount. In yet another scenario, a remotely located bump member connected with the moving wheel component abuttingly strikes a frame component.

Figure 3A:
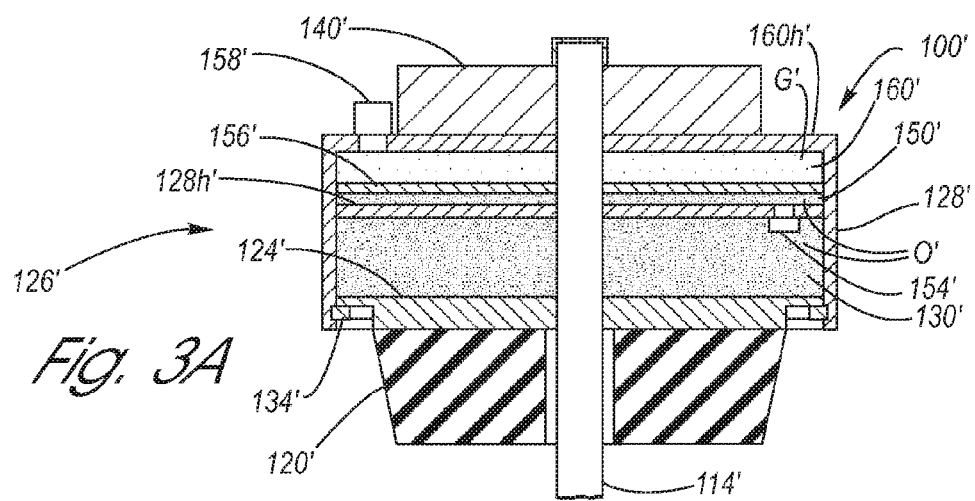
FIG. 3A is a diagrammatic view of a first alternative embodiment of a multistage jounce bumper according to the present invention.

Turning attention now to FIG. 3A, a first alternative embodiment of a multistage jounce bumper 100" according to the present invention is depicted, which embodiment may be considered the most preferred embodiment. In this first alternative embodiment, the communicating reservoir 150' is integrated with the hydraulic cylinder 128'.

The communicating reservoir 150' is integrated with the cylinder head 128h' of a hydraulic cylinder 128' of the hydraulic jounce bumper 126', wherein a piston 156' separates the hydraulic fluid O' from the pressurized gas G' of a gas chamber 160'. The pressurized gas G' is introduced by a gas valve 158'. A floating puck 124' serves as a movable piston with respect to the hydraulic cylinder 128' and they collectively define a hydraulic fluid filled cavity 130'. A ring 134' limits travel of the floating puck with respect to the hydraulic cylinder 128'. A control valve (which may be in the form of a multistage valve) 154' tunably meters the flow of hydraulic fluid O' between the hydraulic fluid filled cavity 130' and the communicating reservoir 150'. A jounce bumper cushion 120' is affixed to the floating puck 124'. A damper (not shown, but like 110 in FIG. 2) has a damper bump plate (not shown, but like 112 in FIG. 2), wherein a damper rod 114' of the damper is connected with a top mount 140'. The top mount 140' is connected to the head 160h' of the gas chamber 160'.

In operation, much like the operation described with respect to FIGS. 2A though 2C, the damper moves toward the top mount 140' during jounce, whereupon the damper plate abuts the jounce bumper cushion 120' and compresses the jounce bumper cushion during the first stage response. Upon the jounce bumper cushion reaching a predetermined amount of compression, the hydraulic fluid O' begins to meter through the control valve 154' into the communicating reservoir 150' in the manner described hereinabove with respect to the second stage response of FIGS. 2A though 2C. Once the hydraulic fluid filled cavity 130' has reached a minimum volume, whereat the hydraulic fluid O' is pressurized to a predetermined maximum and/or the hydraulic fluid has reached a predetermined maximum pressure, the third stage response is implemented, wherein the jounce force and energy are transmitted to the frame, as for example by any of the second and third aforementioned scenarios.

Figure 3B:
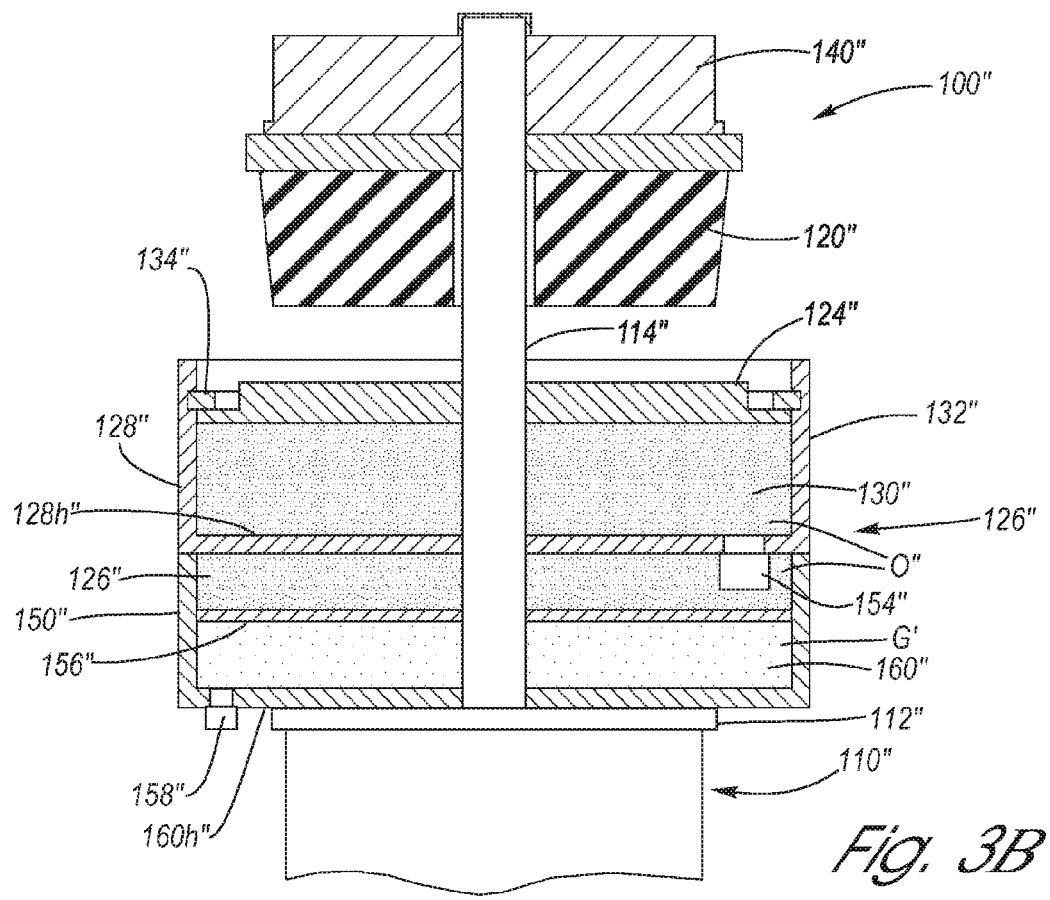
FIG. 3B is a diagrammatic view of a second alternative embodiment of a multistage jounce bumper according to the present invention.

Turning attention now to FIG. 3B, a second alternative embodiment of a multistage jounce bumper 100" according to the present invention is depicted. In this second alternative embodiment, the order of the jounce bumper cushion 120" and the hydraulic jounce bumper 126" are reversed as compared to FIGS. 2 and 3A, and, by way of example, the communicating reservoir 150" is integrated with the hydraulic cylinder 128". Although not specifically shown, it is clear that the hydraulic jounce bumper 126" may alternatively be integrated within the damper 110".

The communicating reservoir 150" is integrated with the cylinder head 128h" of a hydraulic cylinder 128" of the hydraulic jounce bumper 126", wherein a piston 156" separates the hydraulic fluid O" from the pressurized gas G" of a gas chamber 160". The pressurized gas G" is introduced by a gas valve 158". A floating puck 124" serves as a movable piston with respect to the hydraulic cylinder 128" and they collectively define a hydraulic fluid filled cavity 130". A ring 134" limits travel of the floating puck with respect to the hydraulic cylinder 128". A control valve (which may be in the form of a multistage valve) 154" tunably meters the flow of hydraulic fluid O" between the hydraulic fluid filled cavity 130" and the communicating reservoir 150". A jounce bumper cushion 120" is affixed to a top mount 140". A damper 110" is connected, via a damper plate 112", to the head 160h' of the gas chamber 160" and has a damper rod 114" connected to the top mount 140".

In operation, much like the operation described with respect to FIGS. 2A though 2C, the damper 110" moves toward the top mount 140" during jounce, whereupon the floating puck 124" abuts the jounce bumper cushion 120" and compresses the jounce bumper cushion during the first stage response. Upon the jounce bumper cushion reaching a predetermined compression, the hydraulic fluid O" begins to meter through the control valve 154" into the communicating reservoir 150" in the manner described hereinabove with respect to the second stage of response of FIGS. 2A though 2C. Once the hydraulic fluid filled cavity 130" has reached a minimum volume and/or the hydraulic fluid has attained a predetermined maximum pressure, the third stage is implemented, wherein the jounce force and energy are transmitted to the frame, as for example by any of the second and third aforementioned scenarios.

Figure 4:
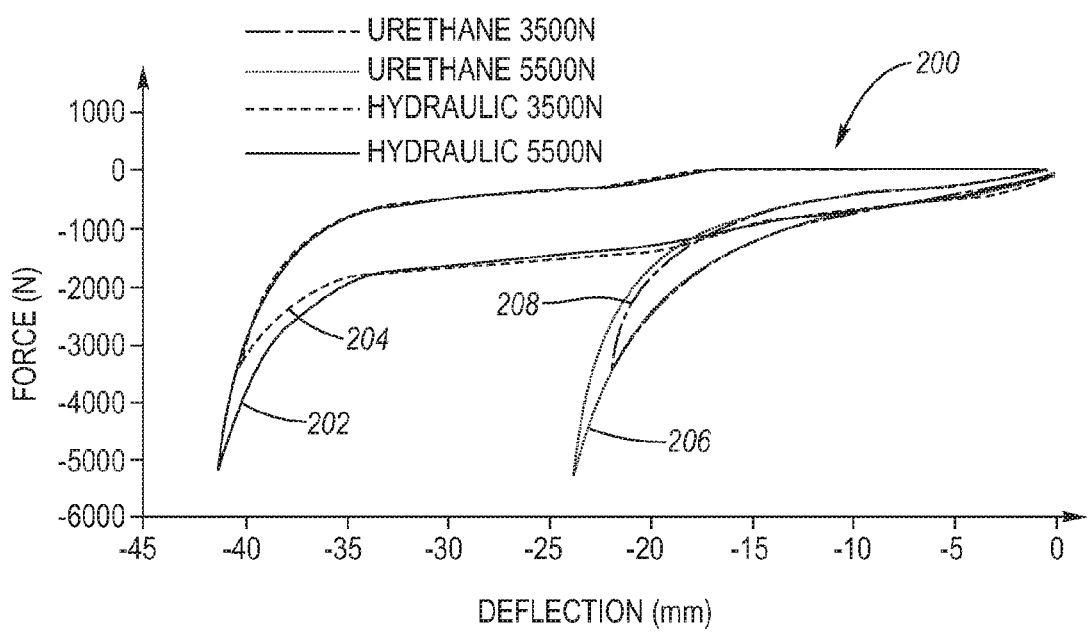
FIG. 4 is a graph showing the performance of the multistage jounce bumper according to the present invention as compared to a conventional jounce bumper cushion, each in terms of static load deflection.

FIG. 4 shows a graph 200 of the performance of the multistage jounce bumper 100 as compared to a conventional jounce bumper cushion, each being subjected to two static loads. A first plot 202 shows the deflection in millimeters produced by a static force of 5,500 Newtons applied to the multistage jounce bumper. A second plot 204 shows the deflection of multistage jounce bumper when subjected to a static force of 3,500 Newtons. A third plot 206 shows the displacement produced by a static force of 5,500 Newtons applied to a conventional jounce bumper cushion. A fourth plot shows the deflection of a conventional jounce bumper cushion when subjected to a static force of 3,500 Newtons. These plots show that the multistage jounce bumper allows for an additional 18 millimeters of travel compared to the conventional jounce bumper cushion, thus allowing for an improved over-all management of the jounce force and energy.

Figure 5:
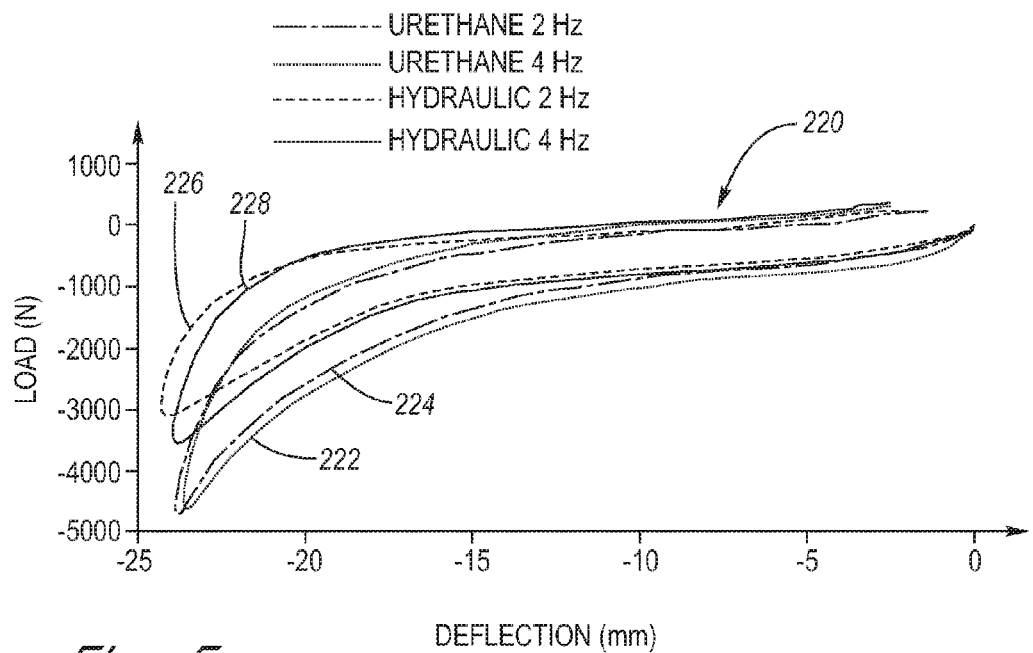
FIG. 5 is a graph showing the performance of the multistage jounce bumper according to the present invention as compared to a conventional jounce bumper cushion, each being subjected to low frequency ramp waves.

FIG. 5 shows a graph 220 of the performance of the multistage jounce bumper 100 as compared to a conventional jounce bumper cushion, each being subjected to low frequency ramp waves. A first plot 222 shows the deflection of a conventional jounce bumper cushion subjected to a 4 Hz frequency ramp wave with maximum amplitude of 25 millimeters. A second plot 224 shows the deflection of a conventional jounce bumper cushion subjected to a 2 Hz frequency ramp wave with maximum amplitude of 25 millimeters. A third plot 226 shows the deflection of a multistage jounce bumper subjected to a 2 Hz frequency ramp wave with maximum amplitude of 25 millimeters. A fourth plot 228 shows the deflection of a multistage jounce bumper subjected to a 4 Hz frequency ramp wave with maximum amplitude of 25 millimeters. These plots show that the multistage jounce bumper can absorb a load approximately 1,300 Newtons greater than the conventional jounce bumper cushion.

Figure 6:
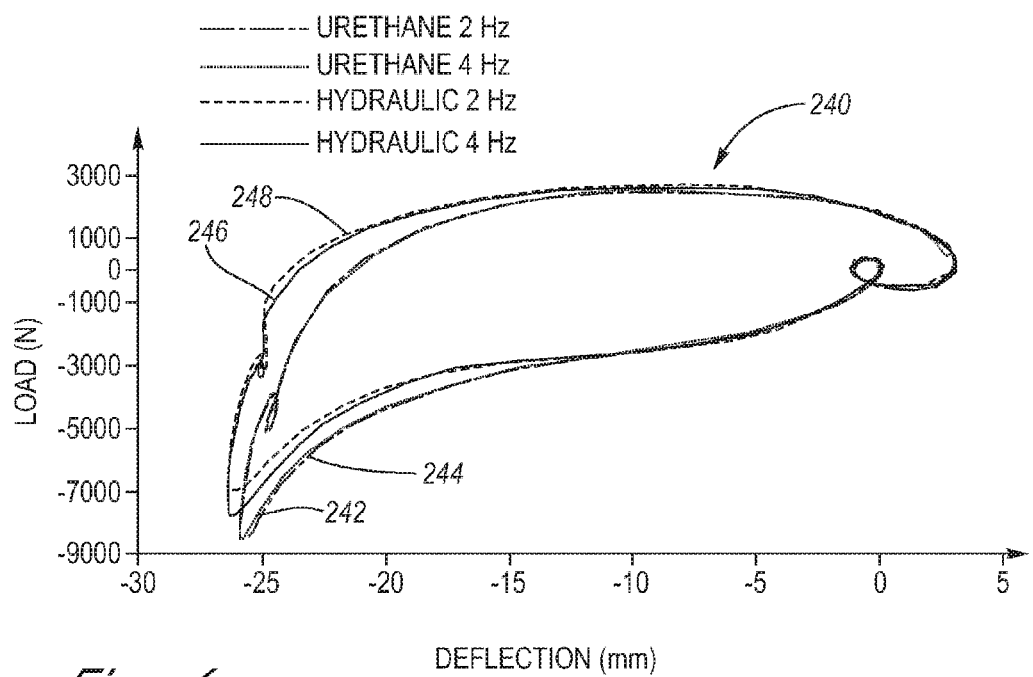
FIG. 6 is a graph showing the performance of the multistage jounce bumper according to the present invention as compared to a conventional jounce bumper cushion, each being subjected to low frequency square waves.

FIG. 6 shows a graph 240 of the performance of the multistage jounce bumper 100 as compared to a conventional jounce bumper cushion, each being subjected to low frequency square waves. A first plot 242 shows the deflection of a conventional jounce bumper cushion subjected to a 2 Hz frequency square wave with maximum amplitude of 25 millimeters. A second plot 244 shows the deflection of a conventional jounce bumper cushion subjected to a 4 Hz frequency square wave with maximum amplitude of 25 millimeters. A third plot 246 shows the deflection of a multistage jounce bumper subjected to a 4 Hz frequency square wave with maximum amplitude of 25 millimeters. A fourth plot 248 shows the deflection of a multistage jounce bumper subjected to a 2 Hz frequency square wave with maximum amplitude of 25 millimeters. These plots show that the multistage jounce bumper can absorb a load approximately 1,500 Newtons greater than the conventional jounce bumper cushion.

To those skilled in the art to which this invention appertains, the above described preferred embodiment may be subject to change or modification. Such change or modification can be carried out without departing from the scope of the invention, which is intended to be limited only by the scope of the appended claims.

The invention claimed is:

1. A multistage jounce bumper for responding to a jounce force in stages, comprising:
   a jounce bumper cushion comprising a resilient material; and
   a hydraulic jounce bumper connected to said jounce bumper cushion, said hydraulic jounce bumper comprising:
      a cylinder and movable piston combination collectively defining an hydraulic fluid filled cavity;
      a communicating hydraulic fluid reservoir fluidically connected to said hydraulic fluid filled cavity;
      a control valve selectively metering hydraulic fluid flow between said hydraulic fluid filled cavity and said hydraulic fluid reservoir, wherein the selective metering by said control valve ranges between a fully closed state whereat the flow is prevented and an open state whereat the flow is enabled; and
      a source of pressurization of hydraulic fluid within said hydraulic fluid reservoir which provides an initial predetermined pressure of the hydraulic fluid in said hydraulic fluid cavity;
   wherein a first stage of response to a jounce force during a jounce comprises:
      the jounce force causing said jounce bumper cushion to become resiliently compressed a predetermined amount; and
      said control valve being in said fully closed state such that metering of hydraulic fluid flow between said hydraulic fluid filled cavity and said hydraulic fluid reservoir is prevented;
   wherein a second stage of response to the jounce force during the jounce comprises said control valve being in said open state such that hydraulic fluid in said hydraulic fluid reservoir is metered flowably into said hydraulic fluid reservoir as said piston moves into said cylinder so as to thereby absorb energy of the jounce; and
   wherein said control valve is tuned such that during the jounce said first stage response precedes said second stage response.

2. The multistage jounce bumper of claim 1, wherein resiliency of said jounce bumper cushion and the initial predetermined pressure of the hydraulic fluid in said hydraulic fluid cavity are such that said second stage of response commences when said jounce bumper cushion achieves substantially saturation.

3. The multistage jounce bumper of claim 1, wherein said source of pressurization is a pressurized gas, and wherein said gas is separated from said hydraulic fluid so that said hydraulic fluid is unmixed with said gas.

4. The multistage jounce bumper of claim 1, wherein the resiliency of said jounce bumper cushion and the initial predetermined pressure of the hydraulic fluid in said hydraulic fluid cavity are such that said first stage of response transitions into said second stage of response substantially seamlessly, whereat a first reaction force of said jounce bumper cushion is substantially equal to a second reaction force of said piston at the transition.

5. The multistage jounce bumper of claim 1, further comprising:
   a damper comprising a bump plate at one end thereof, and a slidably interfaced damper rod, said damper rod extending out through said bump plate;
   wherein the jounce force is transferable to said damper such that said bump plate abuts said jounce bumper cushion at commencement of said first stage of response.

6. The multistage jounce bumper of claim 5, further comprising:
   a top mount connected to said damper rod; and
   a third stage of response to the jounce force, transpiring after said second stage of response whereat said hydraulic jounce bumper has absorbed a predetermined maximum of the energy of the jounce, said third stage response comprising a selected one of:
      a mechanical abutment, via said damper rod, between said damper and said top mount; and an incompressible hydraulic fluid jounce force conduit, via said control valve being in said closed state, between said damper and said top mount.

7. The multistage jounce bumper of claim 6, wherein the resiliency of said jounce bumper cushion and the initial predetermined pressure of the hydraulic fluid in said hydraulic fluid cavity are such that said first stage of response transitions into said second stage of response substantially seamlessly, whereat a first reaction force of said jounce bumper cushion is substantially equal to a second reaction force of said piston at the transition.

8. The multi-stage jounce bumper of claim 7, wherein said source of pressurization is a pressurized gas, wherein said gas is separated from said hydraulic fluid so that said hydraulic fluid is unmixed with said gas.

9. The multistage jounce bumper of claim 8, wherein resiliency of said jounce bumper cushion and the initial predetermined pressure of the hydraulic fluid in said hydraulic fluid cavity are such that said second stage of response commences when said jounce bumper cushion achieves substantially saturation.

10. A multistage jounce bumper for responding to a jounce force in stages, comprising:
    a jounce bumper cushion comprising a resilient material;
    a hydraulic jounce bumper connected to said jounce bumper cushion, said hydraulic jounce bumper comprising:
        a cylinder and movable piston combination collectively defining an hydraulic fluid filled cavity;
        a communicating hydraulic fluid reservoir fluidically connected to said hydraulic fluid filled cavity;
        a control valve selectively metering hydraulic fluid flow between said hydraulic fluid filled cavity and said hydraulic fluid reservoir; and
        a source of pressurization of hydraulic fluid within said hydraulic fluid reservoir which provides an initial predetermined pressure of the hydraulic fluid in said hydraulic fluid cavity; and
    a damper comprising a bump plate at one end thereof, and a slidably interfaced damper rod, said damper rod extending out through said bump plate;
    wherein a first stage of response to a jounce force during a jounce comprises the jounce force causing said jounce bumper cushion to become resiliently compressed a predetermined amount;
    wherein a second stage of response to the jounce force during the jounce comprises hydraulic fluid in said hydraulic fluid reservoir metering flowably into said hydraulic fluid reservoir as said piston moves into said cylinder so as to thereby absorb energy of the jounce;
    wherein the resiliency of said jounce bumper cushion and the initial predetermined pressure of the hydraulic fluid in said hydraulic fluid cavity are such that said first stage of response transitions into said second stage of response substantially seamlessly, whereat a first reaction force of said jounce bumper cushion is substantially equal to a second reaction force of said piston at the transition;
    wherein the jounce force is transferable to said damper such that said bump plate abuts said jounce bumper cushion at commencement of said first stage of response;
    wherein the selective metering by said control valve ranges between a fully closed state whereat the flow is prevented and an open state whereat the flow is enabled; and
    wherein said control valve is tuned such that during the jounce said first stage response precedes said second stage response.

11. The multistage jounce bumper of claim 10, wherein resiliency of said jounce bumper cushion and the initial predetermined pressure of the hydraulic fluid in said hydraulic fluid cavity are such that said second stage of response commences when said jounce bumper cushion achieves substantially saturation.

12. The multistage jounce bumper of claim 10, wherein said source of pressurization is a pressurized gas, and wherein said gas is separated from said hydraulic fluid so that said hydraulic fluid is unmixed with said gas.

13. The multistage jounce bumper of claim 10, further comprising:
    a top mount connected to said damper rod; and
    a third stage of response to the jounce force, transpiring after said second stage of response whereat said hydraulic jounce bumper has absorbed a predetermined maximum of the energy of the jounce, said third stage response comprising a selected one of:
        a mechanical abutment, via said damper rod, between said damper and said top mount; and
        an incompressible hydraulic fluid jounce force conduit, via said control valve being in said closed state, between said damper and said top mount.

14. The multistage jounce bumper of claim 13, wherein said source of pressurization is a pressurized gas, wherein said gas is separated from said hydraulic fluid so that said hydraulic fluid is unmixed with said gas.

15. The multistage jounce bumper of claim 14, wherein resiliency of said jounce bumper cushion and the initial predetermined pressure of the hydraulic fluid in said hydraulic fluid cavity are such that said second stage of response commences when said jounce bumper cushion achieves substantially saturation.

* * * * *